United States Patent
Platnic

(10) Patent No.: US 7,630,386 B2
(45) Date of Patent: Dec. 8, 2009

(54) METHOD FOR PROVIDING BROADBAND COMMUNICATION SERVICE

(75) Inventor: Michel Platnic, Ramat-Gan (IL)

(73) Assignee: ECI Telecom Ltd., Petach-Tikva (IL)

( * ) Notice: Subject to any disclaimer, the term of this patent is extended or adjusted under 35 U.S.C. 154(b) by 499 days.

(21) Appl. No.: 11/518,225

(22) Filed: Sep. 11, 2006

(65) Prior Publication Data

US 2008/0062999 A1 Mar. 13, 2008

(51) Int. Cl.
H04L 12/66 (2006.01)
H04L 9/32 (2006.01)
G06F 15/173 (2006.01)

(52) U.S. Cl. .................. 370/401; 370/463; 709/237; 713/168

(58) Field of Classification Search .................. None
See application file for complete search history.

(56) References Cited

U.S. PATENT DOCUMENTS

| | | | | |
|---|---|---|---|---|
| 6,484,174 B1 * | 11/2002 | Wall et al. | ............ | 707/9 |
| 6,571,290 B2 * | 5/2003 | Selgas et al. | ............ | 709/228 |
| 2003/0014633 A1 * | 1/2003 | Gruber | ............ | 713/170 |
| 2003/0154380 A1 * | 8/2003 | Richmond et al. | ............ | 713/182 |
| 2005/0021959 A1 * | 1/2005 | Tsushima et al. | ............ | 713/170 |
| 2005/0089052 A1 * | 4/2005 | Chen et al. | ............ | 370/401 |
| 2006/0161783 A1 * | 7/2006 | Aiken et al. | ............ | 713/182 |
| 2006/0274774 A1 * | 12/2006 | Srinivasan et al. | ............ | 370/420 |
| 2007/0192843 A1 * | 8/2007 | Peterson et al. | ............ | 726/10 |
| 2008/0059605 A1 * | 3/2008 | Shalev et al. | ............ | 709/217 |
| 2008/0310392 A1 * | 12/2008 | Dowling et al. | ............ | 370/349 |
| 2009/0055542 A1 * | 2/2009 | Zhao et al. | ............ | 709/228 |

* cited by examiner

Primary Examiner—Gregory B Sefcheck
(74) Attorney, Agent, or Firm—Browdy & Neimark, PLLC

(57) ABSTRACT

A method is provided to enable providing broadband communication services to a subscriber having a number of devices connected to a regional gateway (e.g. CPE). The method comprises the steps of: carrying out an authentication process between at one of the subscriber's devices and a network server, upon authenticating the subscriber, downloading information associated with that subscriber to an access node. At the access node, designating a port for communications with the regional gateway, and based on identification of the subscriber, allowing the provisioning of broadband communication services to all of the subscriber's devices connected to regional gateway. When the subscriber's device used for the authentication process is disconnected, the system shall continue allowing the provisioning of the already allowed broadband communication services to the remaining devices that are still connected to the regional gateway.

9 Claims, 2 Drawing Sheets

METHOD FOR PROVIDING BROADBAND COMMUNICATION SERVICE

FIELD OF THE INVENTION

The present invention relates to the provisioning of broadband communication services and, in particular, to the provisioning of such services to a number of devices connected to the network via a single Customer Premises Equipment ("CPE").

BACKGROUND OF THE INVENTION

The use of a broadband network to provide services such as video services has long been adopted. FIG. 1 illustrates a schematic block diagram of some elements of such a system and the connection between them. As can be seen in this Fig. system 2 comprises a subscriber device 12 which is connected to the system via a Residential Gateway ("RG") 10 also known as CPE. RG 10 is connected to an Access Node (AN) 6, e.g. DSLAM, as do a number of other RGs which are typically located at the same geographical neighborhood as RG 10, while the connection between RG 10 and AN 6 is done via one of AN 6 ports, shown as numeral 8 in the Fig. AN 6 is then connected to a Broadband Remote Access Server (BRAS), 4, and to the Service Provider via Broadband Network Gateway (BNG) (not shown in this Fig.). Other elements such as elements for aggregation, or subtended Access Nodes are also not shown in this Fig., but the functionality described herein which relates to basic multicast functions, is maintained also for scenarios using aggregation and subtending.

Thus, the Residential Gateway may for example be connected to the Access Node via DSL using different VLAN. One VLAN may carry the PPPoE traffic, while the multicast traffic is conveyed separately by using a different VLAN. Multicast traffic assigned to different IP multicast groups and forwarded from the BNG, is terminated at the AN. At the AN, the appropriate protocol, such as IGMP, is used to enable subscribers to join or leave respective multicast groups. Both BRAS and BNG receive the IGMP messages simultaneously. The BNG uses the information for controlling of multicast traffic, while the BRAS uses the information to control the port shaper of the ISP stream in order to avoid congestion in the Access Node.

Information about AN's port specific access rights to join a given multicast group is kept in the DSLAM, using Access Control List ("ACL") parameters. The Access Control Lists contain the permission of a DSL port for joining and if joining to which multicast group, so that the various parameters associated with the subscriber are defined and maintained, For example, such parameters could be the number and identity of the channels that are open for the subscriber view, maximum bandwidth allocated for that subscriber, etc.

In order to enable the subscriber to receive the required services, an authentication process is held, typically between the BRAS and the subscriber. Following the authentication process (after having established the PPP session), the BRAS receives the information about permitted multicast groups from the policy server. Based upon the information received, the BRAS communicates control messages—(ACL) to the Access Node. Next, the AN enables or disables the DSL port for multicast services and configures or updates it's ACL parameters.

When the PPP session is terminated, e.g. while shutting down the subscriber's computer, when the subscriber moves with his/her laptop to another location, the DSL port at the AN is disabled and no further traffic is conveyed via the RG.

SUMMARY OF THE INVENTION

It is an object of the present invention to provide a method and apparatus to extend the possibilities of receiving broadband communication services.

It is another object of the present invention to provide a method and an apparatus that allow maintaining connectivity of one or more subscriber's devices, connected to a regional gateway.

Other objects of the invention will become apparent as the description of the invention proceeds.

According to an embodiment of the present invention, there is provided a method for providing broadband communication services to a subscriber associated with a plurality of devices connected directly or indirectly to a Regional Gateway (RG), which method comprises the steps of:

carrying out an authentication process between at least one of the subscriber's devices (hereinafter referred to as "subscriber's authenticating device") and a network server (e.g. Broadband Remote Access Server ("BRAS"), RADIUS in case of applying the 802.1x Recommendation, or Dynamic Host Configuration Protocol ("DHCP") server, and the like) operative to provide parameters associated with said subscriber (e.g. ACL information);

upon completing successfully the authentication process, downloading information associated with that subscriber to a AN;

at the AN, assigning a port to be designated to that RG (e.g. the port identification may be provided within an ANCP message and the AN will assign it for communication with that RG);

based on the subscriber's identification, enabling the provisioning of certain (allowed) broadband communication services to at least one of plurality of devices connected to the Regional Gateway other than to the subscriber's authenticating device (irrespective of whether broadband communication services are provided also via the subscriber's authenticating device, or not); and upon disconnecting the subscriber's device used for the authentication process continue enabling to provide the allowed broadband communication services to the at least one of plurality of devices connected to the Regional Gateway being other than to the subscriber's authenticating device.

The term "broadband communication services" as used herein should be understood to encompass telephony (e.g. voice, fax, video conferencing and the like) services. Also, the term "network server" as used herein should be understood as a server that is part of the network, or as a server which is linked to a network server and is in communication with such a network server, for example, a DHCP server.

As will be appreciated by those skilled in the art, upon assigning a port designated to the specific RG, a communication session between the subscriber's authenticating device (e.g. a laptop) and the network server (e.g. the BRAS) may also be established. In such a case, the step of continue providing the allowed broadband communication services to the at least one of plurality of the subscriber's devices, takes place after having terminated the communication session between the subscriber's authenticating device and the network server, e.g. when the laptop has been disconnected (e.g. by signing off).

According to an embodiment of the present invention, the broadband communication service is of the type of a multicasting service. Preferably, the subscriber identification protocol (e.g. PPPoE) is independent, or not directly linked, to the multicast service (e.g. not sharing the same data link or being initiated by a different physical entity than the one receiving the service). Thus, once the subscriber has been identified, the multicast service becomes independent of the PPPoE session termination. PPPoE session can then be established and terminated on the same port, all without having the video service provided to the other device, being disturbed.

By another embodiment of the invention, in accordance with the present invention, if, after the authenticating device has terminated the session, this device is later discovered on a new port, the ACL may be sent to this new port (e.g. via Access Node Control Protocol (ANCP) as defined by IETF). Preferably, the method further comprises a step of determining once the ACL is sent to that new port, whether the parameters associated with the subscriber allow the subscriber to receive broadband communication services through more than one port, and if not, preventing the receipt of these services via the old port.

By still another embodiment of the invention, a number of services are grouped together, allowing that only one authentication protocol from one of the grouped services is initiated to authenticate the customer. Following a successful authentication, the customer is allowed to use each of the whole group of services. By this embodiment, the number of authentication sessions is reduced, and/or when RADIUS (in case of using the 802.1x protocol) or BRAS (in case of using PPP) are in fault (reset, switch off . . . ) some of the services can still be delivered. In addition, there is no need for re-authentication each time service or device (RG, STB, PC, etc.) is re-activated.

DETAILED DESCRIPTION OF THE INVENTION

A better understanding of the present invention is obtained when the following non-limiting detailed description.

Part or full ACL may be sent to an AN port, removed or modified under the following conditions:

New physical component or link detected with the Access Network—in such a case, an ACL free channels list may be sent to relevant port(s);

First time customer identification on a specific port—Customer dedicated ACL is sent to the port on which customer was detected;

Access Control policy modified for the port or the AN by an operator command or BRAS/RADIUS automatic process. In this case, the BRAS will send, preferably via ANCP (or alternatively via L2C), the new ACL.

A customer who has previously been identified on port x, tries to establish a new PPPoE session on port y, whether that port belongs to the same AN or to a different one. The ACL should then be removed (except perhaps for some channels which are not dependent on authentication, ex: free channels) from port x and the customer dedicated ACL (or part of it) is sent to the port y.

Figure 1:
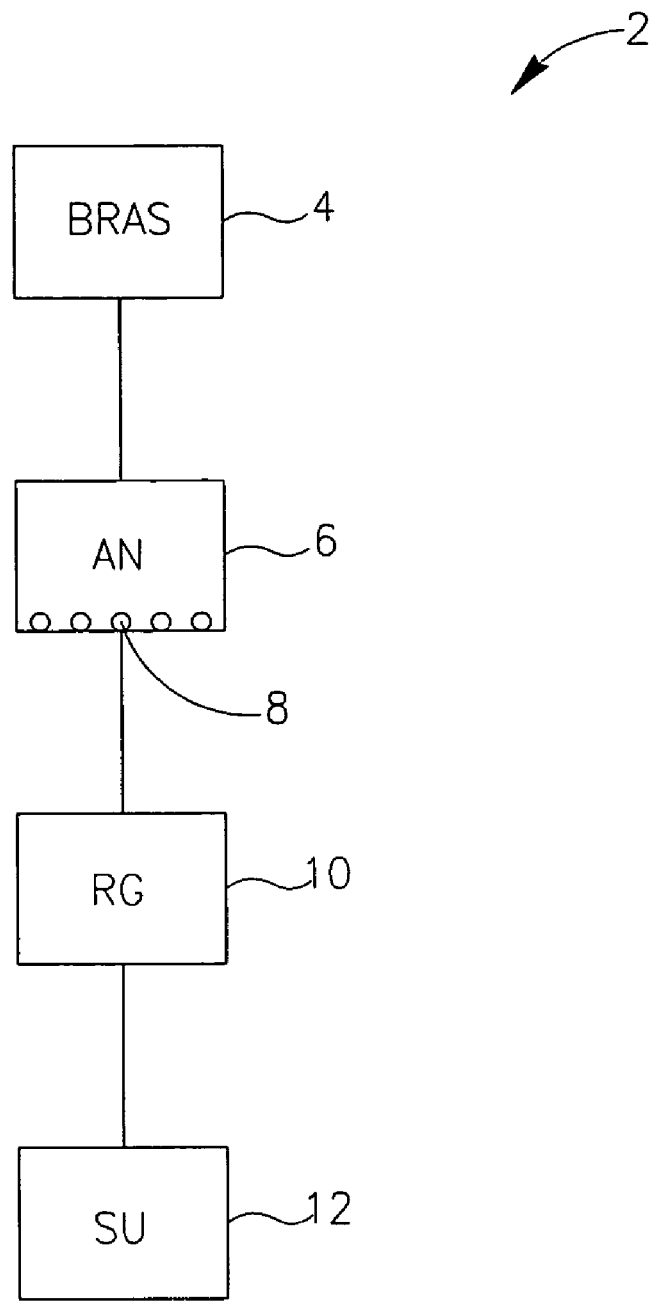
FIG. 1—presents a schematic illustration of a prior art system for the provisioning of broadband communication services.
Figure 2:
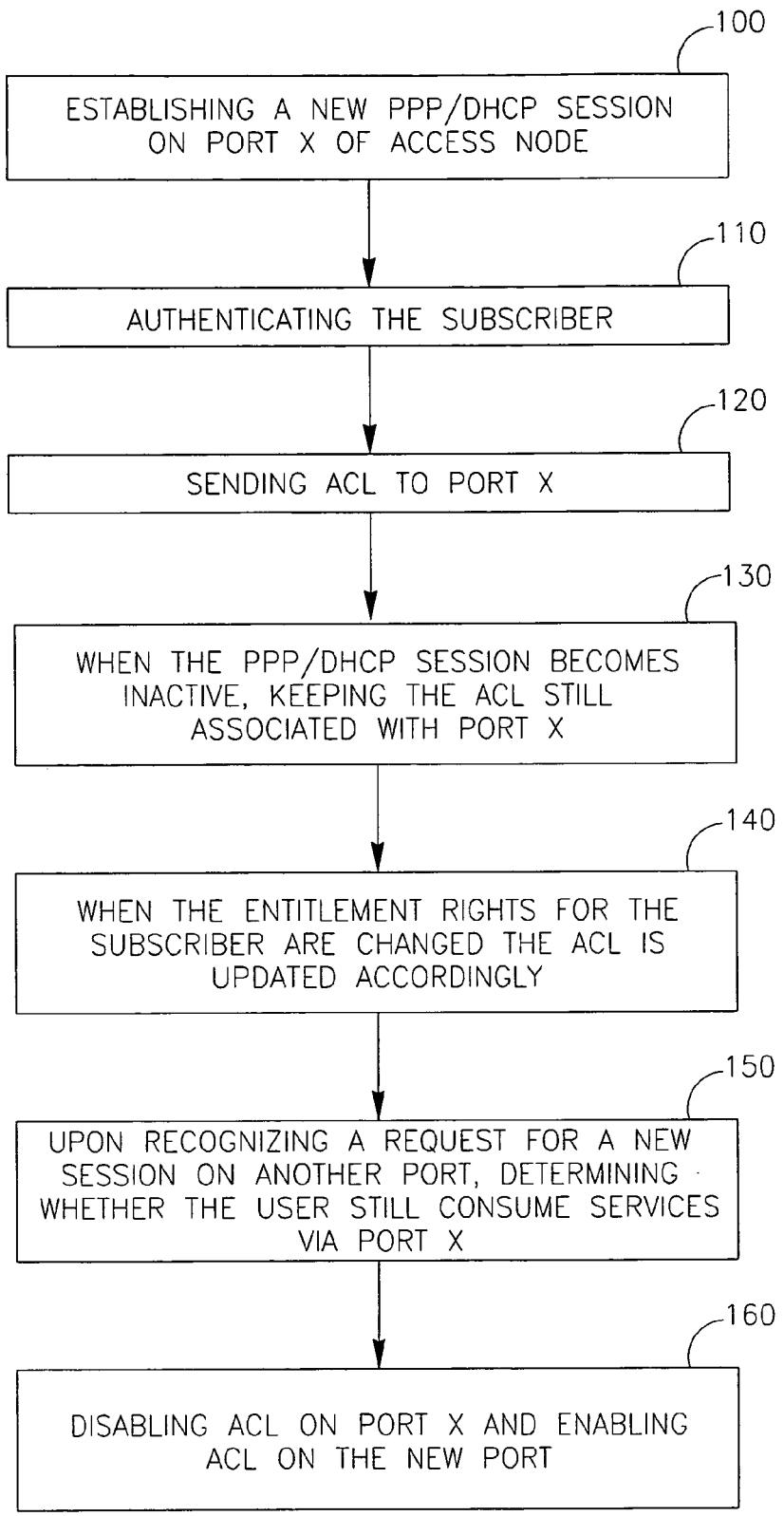
FIG. 2—presents of flow chart demonstrating a method of carrying out an embodiment of the present invention.

Let us now consider an example demonstrating an embodiment of carrying out the method according to the present invention (FIG. 2):

First, a new PPP session is established on AN port x (step 100). The DSLAM through which the session is established includes an intermediate agent that adds the port information to the session's message flow. The flow is then received by the BRAS. Next, (step 110) an authenticating process to authenticate the customer is carried, and upon successful completion thereof, relevant ACL is sent to port x of the DSLAM (step 120).

When the PPP/802.1x/DHCP session becomes inactive (no traffic is exchanged) or timed out (step 130), the ACL is still remains associated with port x. In addition, by a preferred embodiment, even if the PPP session is timed out, the BRAS keeps the user/port information. Preferably, once the entitlement rights change for the customer (ppv service over, new bundle, etc.), the ACL is updated (step 140).

However, when a request for PPP session of same user is recognized on another port (y) (step 150), and at the same time the user is associated according to the BRAS with the last known port, x, then the ACL is disabled on port x (step 160) and the ACL is enabled on port y. Updating the ACL as described above, can happen only after step 120 has been successfully completed. Alternatively, every time there is a request of a user to establish such a session via a new port, the system automatically disables any previous ACL and terminates any broadband communication services that may be provided through the former connection of the user. By yet another alternative, the disabling of the former connection is done only after determining that the subscriber requests through the new port the same services that are currently being provided to one of the subscriber's other devices through port x.

The protocol for establishing the session has been described as PPP or PPP over Ethernet protocol. However, other protocols such as DHCP or IEEE 802.1x may alternatively be used for authentication, where in the latter case, EAP (in accordance with RFC 2284) can be used for communication between the RG and AN (DSLAM) and the IEEE 802.1x standard can be used between AN and RADIUS.

As will be appreciate by those skilled in the art, the broadband network also includes other elements such as elements for aggregation, or subtended Access Nodes, which were not mentioned specifically herein, but the functionality associated with the present invention such as multicast functions should be understood as being relevant also to cases while using aggregation and subtending.

It is to be understood that the above description only includes some embodiments of the invention and serves for its illustration. Numerous other ways of carrying out the methods provided by the present invention may be devised by a person skilled in the art without departing from the scope of the invention, and are thus encompassed by the present invention.

The invention claimed is:

1. A method for providing broadband communication services to a subscriber associated with a plurality of devices connected to a Regional Gateway (RG), which method comprises the steps of:

carrying out an authentication process between at least one of said subscriber's devices and a network server operative to provide parameters associated with said subscriber; upon completing successfully said authentication process, downloading information associated with said subscriber to an Access Node (AN);

at said AN, designating a first port for communications with said RG;

based on identification of said subscriber, enabling the provisioning of broadband communication services to at least one of said plurality of devices connected to said RG other than to said subscriber authenticating device; and upon disconnecting the subscriber's device used for the authentication process, continue enabling the provisioning of said broadband communication services to said at least one other device connected to said RG, without carrying out an authentication process between said at least one other device and the network server.

2. A method according to claim 1, wherein one or more of said broadband communication services is a multicasting type of service.

3. A method according to claim 1, wherein broadband communication services available for said subscriber based on the subscriber's identification, are comprised in an Access Control List (ACL).

4. A method according to claim 3, further comprising a step of updating said ACL after said authenticating device has terminated the communication session.

5. A method according to claim 3, further comprising a step of enabling communications with said subscriber's authenticating device via a different port.

6. A method according to claim 5, wherein said different port is comprised in a different AN.

7. A method according to claim 5, further comprising a step of determining whether said subscriber is entitled to receive broadband communication services through more than one port.

8. A method according to claim 7, further comprising a step of preventing receipt of said broadband communication services if determined that said subscriber is not entitled to receive them through more than one port.

9. A method according to claim 1, wherein said subscriber's authenticating device is a laptop.

* * * * *